United States Patent
Watanabe et al.

(10) Patent No.: US 7,040,530 B2
(45) Date of Patent: May 9, 2006

(54) PRINTING DEVICE, METHOD OF INSTRUCTING PRINTING, AND DEVICE FOR INSTRUCTING PRINTING

(75) Inventors: Hiroyuki Watanabe, Iwatsuki (JP);
Hideaki Sugimoto, Iwatsuki (JP);
Hideaki Takayama, Iwatsuki (JP);
Satoshi Egawa, Iwatsuki (JP);
Kazunobu Uchiyama, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 425 days.

(21) Appl. No.: 10/228,205

(22) Filed: Aug. 27, 2002

(65) Prior Publication Data
US 2003/0161670 A1    Aug. 28, 2003

(30) Foreign Application Priority Data
Feb. 28, 2002   (JP) .............................. 2002-053218

(51) Int. Cl.
*G06F 17/00* (2006.01)

(52) U.S. Cl. .................................................. 235/375

(58) Field of Classification Search ................................
235/462.01–462.45, 456, 375, 432, 383;
358/1.15, 1.13, 1.16, 1.17, 1.18; 400/61
See application file for complete search history.

(56) References Cited

U.S. PATENT DOCUMENTS

| 5,442,732 A | * | 8/1995 | Matysek et al. ............ 358/1.17 |
| 2003/0161670 A1 | * | 8/2003 | Watanabe et al. ............. 400/61 |
| 2004/0057073 A1 | * | 3/2004 | Egawa et al. .............. 358/1.15 |
| 2004/0061899 A1 | * | 4/2004 | Kimura ..................... 358/1.16 |

OTHER PUBLICATIONS

Microsoft Windows NT 4.0 screen shots, Microsoft Corporation, 1998.*

* cited by examiner

*Primary Examiner*—Thien M. Le
(74) *Attorney, Agent, or Firm*—Oliff & Berridge, PLC.

(57) ABSTRACT

Choices relating to printing conditions which can be designated at a printing device are displayed on a display section of a host device. The choices are displayed as folders. Folder groups, in which printing conditions relating to sheet size, number of sets, double-sided/single-sided printing, N-UP printing, and absence/presence of sorting are set as names of folders, are displayed successively and hierarchically. Here, by selecting designations until a folder of a lowest hierarchy and by manipulating a file of print data into the folder, printing conditions at a time of printing the print data are designated and are transmitted to the printing device.

22 Claims, 17 Drawing Sheets

FIG.2

| STORAGE REGION 1 | A4 | 1 SET | SINGLE-SIDED | 1-UP |
|---|---|---|---|---|
| STORAGE REGION 2 | A3 | 2 SETS | DOUBLE-SIDED | 2-UP |
| STORAGE REGION 3 | B4 | 10 SETS | SINGLE-SIDED | SORT |
| STORAGE REGION 4 | B5 | 1 SET | SINGLE-SIDED | 4-UP |
| ⋮ | | ⋮ | | |
| STORAGE REGION n | A4 | 1 SET | SINGLE-SIDED | 1-UP |

FIG.7A

PRINTER 1: SHEET SIZE

- A3 SHEET SIZE
- A4 SHEET SIZE
- B4 SHEET SIZE
- B5 SHEET SIZE
- POSTCARD SIZE
- LEAVE-IT-TO-US PRINTING

FIG.7B

PRINTER 1: NUMBER OF SETS

- 1 TO 9 SETS
- 10 TO 99 SETS
- 100 OR MORE SETS
- LEAVE-IT-TO-US PRINTING

FIG.7C

PRINTER 1: NUMBER OF SETS

- 1 SET
- 2 SETS
- 3 SETS
- 4 SETS
- 5 SETS
- 6 SETS
- 7 SETS
- 8 SETS
- 9 SETS

FIG.7D

PRINTER 1: DOUBLE-SIDED/ SINGLE-SIDED

- DOUBLE-SIDED PRINTING
- SINGLE-SIDED PRINTING

FIG.7E

PRINTER 1: N-UP

PRINTER 1: SORTING

- SORT
- DO NOT SORT

PRINTING DEVICE, METHOD OF INSTRUCTING PRINTING, AND DEVICE FOR INSTRUCTING PRINTING

BACKGROUND OF THE INVENTION

1. Field of the Invention

The present invention relates to a printing device such as a printer, a method of instructing printing for making a printing device print print data, and a device for instructing printing to which the method of instructing printing is applied.

2. Description of the Related Art

Conventionally, when printing is carried out at a printing device such as a printer, generally, print data is transmitted from a host device such as a personal computer (PC) or the like connected to the printing device, via a printer driver provided at the host device. In this case, when, for example, a user gives an instruction at the host device to print print data which has been prepared by a desired application, a printer driver, which corresponds to the arbitrary printer from which the user wishes to output, is called up, and the print data is converted into a predetermined control code such as PDL (Page Description Language) or the like which the printer can interpret, and the converted data is outputted to the printer. Further, the user can designate, by the printer driver, printing conditions for the print data, such as the sheet size, the number of sheets to be outputted, the number of sets to be outputted, whether printing is to be double-sided or single-sided printing, whether sorting is to be carried out or not, and the like. The print data can thereby be outputted in a desired format.

However, in the user interface (UI) screen at the time of setting the printing conditions at the printer driver described above, usually, setting of the printing conditions is carried out by switching between plural screens by using tabs or the like. It is extremely difficult to understand at what positions, on the UI screen of the printer driver, the places for setting the desired functions of the UI screen are located at. Further, the structure of the UI screen of a printer driver differs for each printer manufacturer. Thus, when operating a printer driver which one is usually not accustomed to, it is even more difficult to understand at what positions, on the UI screen of the printer driver, the places for setting the functions are at. Moreover, attempts have been made to apply printer drivers, which are used in conventional PCs or the like, as is to mobile terminals such as cellular phones, PDAs (Personal Digital Assistants) or the like. In such cases, because the display screen of the cellular phone or the mobile terminal is much smaller than that of a PC, the entire UI screen of the printer driver cannot be appropriately displayed within the region of the display screen. Accordingly, there are cases in which the operability severely deteriorates. Thus, it has been thought to divide the screen structure even more finely than that of a printer driver for a PC, such that display is possible even at a cellular phone or a mobile terminal. However, if the screen structure becomes too fine, in such cases as well, the operability may deteriorate severely.

SUMMARY OF THE INVENTION

The present invention has been conceived of in light of the above-described circumstances, and an object of the present invention is to provide a printing device, a method of instructing printing, and a device for instructing printing which can be applied not only to PCs, but also to cases in which a printing instruction is given from a device having a small display screen or the like, and which have good operability for the user.

In order to achieve the above-described object, a first aspect of the present invention is a printing device comprising: a receiving section which receives print data from a host device; a storing section which stores information of plurality of folders at which predetermined printing conditions are set as names of the folders; and a printing controlling section which carrys out printing control of the print data on the basis of content of printing condition set in accordance with a folder set such that the print data received at the receiving section is stored in the folder.

The receiving section receives print data transmitted from a host device. The data communication between the receiving section and the host device is preferably carried out by using a communication protocol such as FTP (File Transfer Protocol) or HTTP (Hyper Text Transfer Protocol). Further, the storage section stores the information of folders in which predetermined printing conditions are set as the names of the folders. The printing controlling section carries out printing control of the print data received at the receiving section, on the basis of contents of printing conditions set in accordance with the folder designated such that the print data is stored in the folder. In this way, setting of the printing conditions of the print data can be carried out easily without using a special software for the setting of printing conditions.

A plurality of folders of the storing section are provided, and a printing condition is set at each folder. The printing conditions set at the folders provided at the storing section are formed from plural items. In this way, a variety of printing conditions can be set.

A second aspect of the present invention is a printing device comprising: a receiving section which receives print data from a host device; a storing section which stores information relating to first regions provided respectively for a plurality of printing conditions, and information relating to second regions provided, as lower hierarchies of the first regions, for printing conditions relating to items other than a selected item of the printing conditions set with respect to the first regions; and a printing controlling section which carrys out printing control of print data received at the receiving section, on the basis of content of printing condition corresponding to a second region which is designated such that the print data is stored in the second region.

The receiving section receives print data from a host device. It is preferable that the data communication between the receiving section and the host device is carried out by using a communication protocol such as FTP or HTTP or the like. The storing section stores information relating to first regions provided respectively for a plurality of printing conditions, and information relating to second regions provided, as lower hierarchies of the first regions, for printing conditions relating to items other than a selected item of the printing conditions set with respect to the first regions. Each region may be a folder. Further, the printing controlling section carries out printing control of the print data received at the receiving section, on the basis of contents of printing conditions corresponding to a second region which is designated such that the print data is stored in the second region. In this way, setting of the printing conditions of the print data can be carried out easily without using a special software for the setting of printing conditions.

A third aspect of the present invention is a printing device comprising: a receiving section which receives print data from a host device; a storing section which stores information relating to a plurality of first regions provided respectively for a plurality of items of predetermined printing conditions, and information relating to second regions provided, as lower hierarchies of the first regions, for set values of the items; and a printing controlling section which carrys out printing control of print data received at the receiving section, on the basis of content of set values corresponding to the second region which is designated such that the print data is stored in the second region.

The receiving section receives print data from a host device. It is preferable that the data communication between the receiving section and the host device is carried out by using a communication protocol such as FTP or HTTP or the like. The storing section stores information relating to first regions provided for items of predetermined printing conditions, and information relating to second regions provided, as lower hierarchies of the first regions, for set values of the items. The regions may be folders. The printing controlling section carries out printing control of the print data received at the receiving section, on the basis of contents of set values corresponding to the second region which is designated such that the print data is stored in the second region. In this way, setting of the printing conditions of the print data can be carried out easily without using a special software for the setting of printing conditions.

The storing section further includes third regions provided for items other than a selected item of the printing conditions set in accordance with the first regions. Further, by providing plural first regions and plural second regions, a variety of printing conditions can be set.

By setting the items and the set values of the printing conditions corresponding to the respective regions as the names of the regions, the printing conditions which are to be set can be clearly identified.

Moreover, when the third regions exist in a case in which a second region is designated such that the data is stored in the second region, the printing controlling section carries out printing at an initial set value for a set value of a printing condition of a hierarchy lower than the second region. The setting of the printing conditions can thereby be simplified.

The storing section may further have, as a hierarchy lower than the second regions, fourth regions for carrying out printing at initial set values which have been set in advance for printing conditions other than the printing conditions set at the second regions. The setting of the printing conditions can thereby be simplified.

The print data stored in the regions of the storing section are deleted from the regions after being converted into a predetermined data format for carrying out printing, or after printing has been completed. It is thereby possible to conserve the storage capacity of the storing section.

A fourth aspect of the present invention is a printing device comprising: a receiving section which receives information relating to a hierarchical structure of printing conditions from a host device; an analyzing section which analyzes the information relating to the hierarchical structure of the printing conditions; and a printing controlling section which carrys out printing control of print data on the basis of contents of printing conditions which were determined in accordance with the hierarchical structure received at the receiving section and which were analyzed at the analyzing section.

The receiving section receives information relating to a hierarchical structure of printing conditions from a host device. It is preferable that the data communication between the receiving section and the host device is carried out by using a communication protocol such as FTP or HTTP or the like. The analyzing section analyzes the information relating to the hierarchical structure of the printing conditions. The printing controlling section carries out printing control of print data on the basis of contents of printing conditions which were determined in accordance with the hierarchical structure received at the receiving section and which were analyzed at the analyzing section. In this way, it is possible to conserve the storage capacity of the storing section, and setting of the printing conditions of the print data can be carried out easily without using a special software for the setting of printing conditions.

A fifth aspect of the present invention is a method of instructing printing, comprising the steps of: displaying a first screen in which a plurality of printing conditions are displayed; when one of the printing conditions is selected, displaying a second screen which displays printing conditions relating to items other than a selected item of the printing conditions displayed in the first screen; and transferring a predetermined file to a printing device as print data, on the basis of the printing condition selected at the first screen and a printing condition selected at the second screen.

A first screen, in which a plurality of printing conditions are displayed, is displayed. Here, when one of the printing conditions is selected, a second screen, which displays printing conditions relating to items other than a selected item of the printing conditions displayed in the first screen, is displayed. A predetermined file is transferred to a printing device as print data, on the basis of the printing condition selected at the first screen and a printing condition selected at the second screen. In this way, setting of the printing conditions of the print data can be carried out easily without using a special software for the setting of printing conditions.

A sixth aspect of the present invention is a method of instructing printing, comprising the steps of: displaying a first screen in which an item of a predetermined printing condition is displayed; when the item is selected, displaying a second screen which displays a plurality of set values corresponding to the item; when one of the plurality of set values displayed on the second screen is selected, displaying a third screen which displays an item other than a selected item of the printing condition displayed on the first screen; and transferring a predetermined file to a printing device as print data, on the basis of a set value selected from among the plurality of set values.

A first screen, in which an item of a predetermined printing condition is displayed, is displayed. Here, when the item is selected, a second screen, which displays a plurality of set values corresponding to the item, is displayed. When one of the plurality of set values displayed on the second screen is selected, a third screen, which displays an item other than a selected item of the printing condition displayed on the first screen, is displayed. A predetermined file is transferred to a printing device as print data, on the basis of a set value selected from among the plurality of set values. In this way, setting of the printing conditions of the print data can be carried out easily without using a special software for the setting of printing conditions.

By displaying a plurality of items of the printing conditions, a variety of printing conditions can be set.

A seventh aspect of the present invention is a method of instructing printing, comprising the steps of: displaying first folders which are provided respectively for plural printing conditions; when one of the first folders is selected, displaying, as a lower hierarchy, second folders provided for printing conditions relating to items other than a selected item of a printing condition set for the first folders; and in accordance with manipulation of a file to a displayed second folder, transferring the file to a printing device as print data.

First folders, which are provided respectively for plural printing conditions, are displayed. Here, when one of the first folders is selected, second folders, which are provided for printing conditions relating to items other than a selected item of a printing condition set for the first folders, are displayed as a lower hierarchy. Further, in accordance with manipulation of a file to a displayed second folder, the file is transferred to a printing device as print data. In this way, setting of the printing conditions of the print data can be carried out easily without using a special software for the setting of printing conditions.

An eighth aspect of the present invention is a method of instructing printing, comprising the steps of: displaying a plurality of first folders provided respectively for plural items of predetermined printing conditions; when the first folder is selected, displaying, as a lower hierarchy, second folders provided for set values of the item; and in accordance with manipulation of a file to a displayed second folder, transferring the file to a printing device as print data.

A plurality of first folders provided respectively for items of predetermined printing conditions are displayed. Here, when the first folder is selected, second folders provided for set values of the item are displayed as a lower hierarchy. In accordance with manipulation of a file to a displayed second folder, the file is transferred to a printing device as print data. In this way, setting of the printing conditions of the print data can be carried out easily without using special software for the setting of printing conditions.

Further, the method of instructing printing further comprises the step of: when the second folder is selected, displaying, as a lower hierarchy, third folders provided for items other than a selected item of a printing condition set for the first folder. It is thereby possible to set a variety of printing conditions.

By providing a plurality of first folders and a plurality of second folders, a variety of printing conditions can be set.

By setting the items and the set values of the printing conditions corresponding to the respective folders as the names of the folders, the printing conditions which are to be set can be clearly identified.

A ninth aspect of the present invention is a device for instructing printing, comprising: a display section which displays a first screen displaying a plurality of printing conditions, and which, when one of the printing conditions is selected, displays a second screen displaying printing conditions relating to items other than a selected item of the printing conditions displayed on the first screen; and a transfer section which transfers a predetermined file to a printing device as print data, on the basis of the printing condition selected at the first screen and a printing condition selected at the second screen.

The display section displays a first screen displaying a plurality of printing conditions. When one of the printing conditions is selected, the display section displays a second screen displaying printing conditions relating to items other than a selected item of the printing conditions displayed on the first screen. The transfer section transfers a predetermined file to a printing device as print data, on the basis of the printing condition selected at the first screen and a printing condition selected at the second screen. In this way, setting of the printing conditions of the print data can be carried out easily without using a special software for the setting of printing conditions.

A tenth aspect of the present invention is a device for instructing printing, comprising: a display section which displays a first screen at which an item of a predetermined printing condition is displayed, which, when the item is selected, displays a second screen displaying a plurality of set values corresponding to the item, and which, when one of the plurality of set values displayed on the second screen is selected, displays a third screen displaying an item other than a selected item of the printing condition displayed on the first screen; and a transfer section transferring a predetermined file to a printing device as print data, on the basis of a set value selected from among the plurality of set values.

The display section displays a first screen at which an item of a predetermined printing condition is displayed. When the item is selected, the display section displays a second screen displaying a plurality of set values corresponding to the item. Further, when one of the plurality of set values displayed on the second screen is selected, the display section displays a third screen displaying an item other than a selected item of the printing condition displayed on the first screen. The transfer section transfers a predetermined file to a printing device as print data, on the basis of a set value selected from among the plurality of set values. In this way, setting of the printing conditions of the print data can be carried out easily without using a special software for the setting of printing conditions.

By displaying a plurality of the items of the printing conditions on the display section, a variety of printing conditions can be set, and the respective items can be easily set in a desired order.

An eleventh aspect of the present invention is a device for instructing printing, comprising: a display section which displayds first folders which are provided respectively for plural printing conditions, and which, when one of the first folders is selected, displays, as a lower hierarchy, second folders provided for printing conditions relating to items other than a selected item of a printing condition set for the first folders; and a transfer section which, in accordance with manipulation of a file to a displayed second folder, transfers the file to a printing device as print data.

The display section displays first folders which are provided respectively for plural printing conditions. When one of the first folders is selected, the display section displays, as a lower hierarchy, second folders provided for printing conditions relating to items other than a selected item of a printing condition set for the first folders. Further, in accordance with manipulation of a file to a displayed second folder, the transfer section transfers the file to a printing device as print data. In this way, setting of the printing conditions of the print data can be carried out easily without using a special software for the setting of printing conditions.

A twelfth aspect of the present invention is a device for instructing printing, comprising: a display section which displays a plurality of first folders provided respectively for plural items of predetermined printing conditions, and which, when the first folder is selected, displays, as a lower hierarchy, second folders provided for set values of the item; and a transfer section which, in accordance with manipulation of a file to a displayed second folder, transfers the file to a printing device as print data.

The display section displays first folders provided for items of predetermined printing conditions. When the first folder is selected, the display section displays, as a lower hierarchy, second folders provided for set values of the item. In accordance with manipulation of a file to a displayed second folder, the transfer section transfers the file to a printing device as print data. In this way, setting of the printing conditions of the print data can be carried out easily without using a special software for the setting of printing conditions.

When the second folder is selected, the display section displays, as a lower hierarchy, third folders provided for items other than a selected item of a printing condition set for the first folder. The operations of selecting the respective items can thereby be carried out efficiently.

Further, by providing a plurality of the first folders and a plurality of the second folders, a variety of printing conditions can be set.

By setting the items and the set values of the printing conditions corresponding to the respective folders as the names of the folders, the printing conditions which are to be set can be clearly identified.

A thirteenth aspect of the present invention is a printing device comprising: a first screen information outputting section which outputs information for displaying a first screen which displays a plurality of printing conditions; a second screen information outputting section which, when one of the printing conditions is selected, outputs information for displaying a second screen which displays printing conditions relating to items other than a selected item of the printing conditions displayed on the first screen; and a printing controlling section which carries out printing control on the basis of the printing condition selected at the first screen and a printing condition selected at the second screen.

The first screen information outputting section outputs information for displaying a first screen which displays a plurality of printing conditions. When one of the printing conditions is selected, the second screen information outputting section outputs information for displaying a second screen which displays printing conditions relating to items other than a selected item of the printing conditions displayed on the first screen. Further, the printing controlling section carries out printing control on the basis of the printing condition selected at the first screen and a printing condition selected at the second screen. In this way, the first screen, which displays a plurality of printing conditions, is displayed. Here, when one of the printing conditions is selected, the display switches such that the second screen, which displays printing conditions relating to items other than the selected item of the printing conditions displayed on the first screen, is displayed. The display of screens for setting the printing conditions of the print data can be carried out easily without using a special software for the setting of printing conditions.

A fourteenth aspect of the present invention is a printing device comprising: a first screen information outputting section which outputs information for displaying a first screen which displays an item of a predetermined printing condition; a second screen information outputting section which, when the item is selected, outputs information for displaying a second screen which displays a plurality of set values corresponding to the item; a third screen information outputting section which, when one of the plurality of set values displayed on the second screen is selected, outputs information for displaying a third screen which displays an item other than a selected item of the printing condition displayed on the first screen; and a printing controlling section which carrys out printing control on the basis of a set value selected from among the plurality of set values.

The first screen information outputting section outputs information for displaying a first screen which displays an item of a predetermined printing condition. When the item is selected, the second screen information outputting section outputs information for displaying a second screen which displays a plurality of set values corresponding to the item. When one of the plurality of set values displayed on the second screen is selected, the third screen information outputting section outputs information for displaying a third screen which displays an item other than a selected item of the printing condition displayed on the first screen. Further, the printing controlling section carries out printing control on the basis of a set value selected from among the plurality of set values. In this way, the first screen, which displays an item of a predetermined printing condition, is displayed. Here, when the item is selected, the display switches such that the second screen, which displays a plurality of set values corresponding to the item, is displayed. Further, here, when one of the plurality of set values displayed on the second screen is selected, the third screen, which displays an item other than the selected item of the printing condition displayed on the first screen, can be displayed. The display of screens for setting of the printing conditions of the print data can be carried out easily without using a special software for the setting of printing conditions.

By displaying a plurality of the items of the printing conditions, a variety of printing conditions can be set, and the respective items can be easily set in a desired order.

BRIEF DESCRIPTION OF THE DRAWINGS

FIG. 2 is a diagram for explaining storage regions of a data storage section relating to the embodiment of the present invention.

FIGS. 7A through 7F are diagrams for explaining examples of display screens showing folder groups corresponding to the first example of the hierarchical information of FIG. 3.

DESCRIPTION OF THE PREFERRED EMBODIMENTS

Hereinafter, embodiments of the present invention will be described with reference to the drawings. It is to be noted that the present invention is not limited to the following embodiments.

A host device (details of which will be described later), which transmits desired print data and gives printing instructions to the printing device relating to the present embodiment, is used in a state of being connected to the printing device. A PC, a mobile information terminal such as a PDA or a cellular phone, or the like can be used as the host device.

Figure 1:
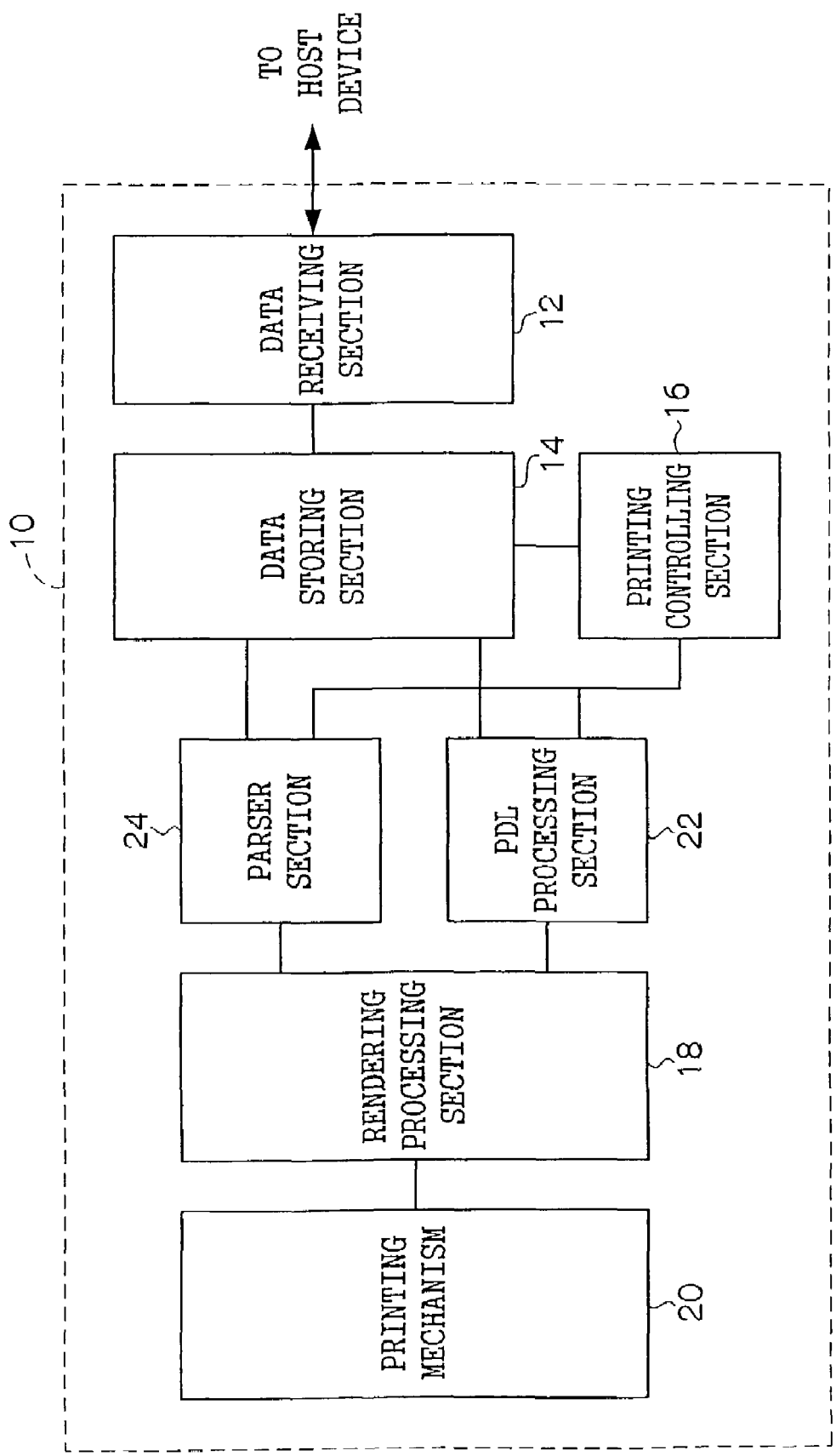
FIG. 1 is a diagram showing the schematic structure of a printing device relating to an embodiment of the present invention.

The schematic structure of a printing device 10 relating to the present embodiment is shown in FIG. 1. The printing device 10 has a data receiving section 12 which receives print data transmitted from the host device; a data storing section 14 which stores the print data received at the data receiving section 12; a print control section 16 carrying out overall control of the printing device 10; a rendering processing section 18 expanding the print data into image data; and a printing mechanism 20 printing the print data onto a predetermined sheet on the basis of the image data generated at the rendering processing section 18.

The printing device 10 has a PDL processing section 22 interpreting the print data expressed in a predetermined page description language; and a parser section 24 interpreting a file of print data prepared on a predetermined application software of the host device. In the parser section 24, the print data is interpreted in accordance with the predetermined application, and the data is processed so as to be able to be printed at the printing mechanism 20.

The data receiving section 12 can identify the file type of the received print data. Namely, the data receiving section 12 automatically judges whether the received print data is PDL data expressed in a predetermined page description language, or is a predetermined application file. Note that the data receiving section 12 is not limited to the same, and a user may manually designate the file type of the print data at the data receiving section 12. Further, the transmission of the print data from the host device can utilize a general FTP (File Transfer Protocol) or HTTP (Hyper Text Transfer Protocol) or the like as the protocol for the file transfer.

Here, explanation will be given of the PDL processing section 22 and the parser section 24 which convert the received print data into image data.

The data receiving section 12 identifies the file type of the received print data. When the file type is judged to be a file format of an application supported at the printing device 10, the print data is transferred to the parser section 24. At the parser section 24, the file of the received print data is analyzed on the basis of the format of the corresponding application.

As another route, when PDL data prepared at the host device is received, the print data is judged at the data receiving section 12 to be PDL data, and as a result, is transferred to the PDL processing section 22 and interpreted thereat.

Although the printing device 10 relating to the present embodiment has the PDL processing section 22 and the parser section 24, it suffices for the printing device 10 to have only either one.

When the printing device 10 is provided with the parser section 24, there are fewer processing steps and the printing processing time is shorter as compared with ordinary printing carried out via an application. Namely, when printing from an application, the following steps are executed at the host device:

① starting-up of the application;
② opening of the file;
③ executing the print settings and instructions;
④ communicating between the GDI (Graphics Device Interface) and the printer driver;
⑤ preparing the PDL corresponding data; and
⑥ transmitting the data to the printing device.

However, the following steps are carried out in the data transmission in the present embodiment:

① designating the file;
② executing the print settings and instructions;
③ adding printing information; and
④ transmitting the data to the printing device.

In this way, at the printing device 10 having the parser section 24, the processes of starting-up the application and opening the file, which require much processing time, are eliminated. Therefore, the time required for executing printing can be greatly shortened.

As shown in FIG. 2, a plurality of predetermined regions, from storage region 1 to storage region n (where n is a natural number), is provided at the data storing section 14. Predetermined printing conditions are correspondingly defined in advance in each region. In the present embodiment, each region is defined as folders. The predetermined printing conditions are set as the folder names. The folder structure in the data storing section 14 can be referred to from the host device. The items of the printing conditions set at the respective regions provided as folders in the data storing section 14 are plural items such as sheet size, number of sets, single-sided/double-sided printing, sorting, N-UP (i.e., data of N number of pages being printing on a single page), and the like.

Figure 3:
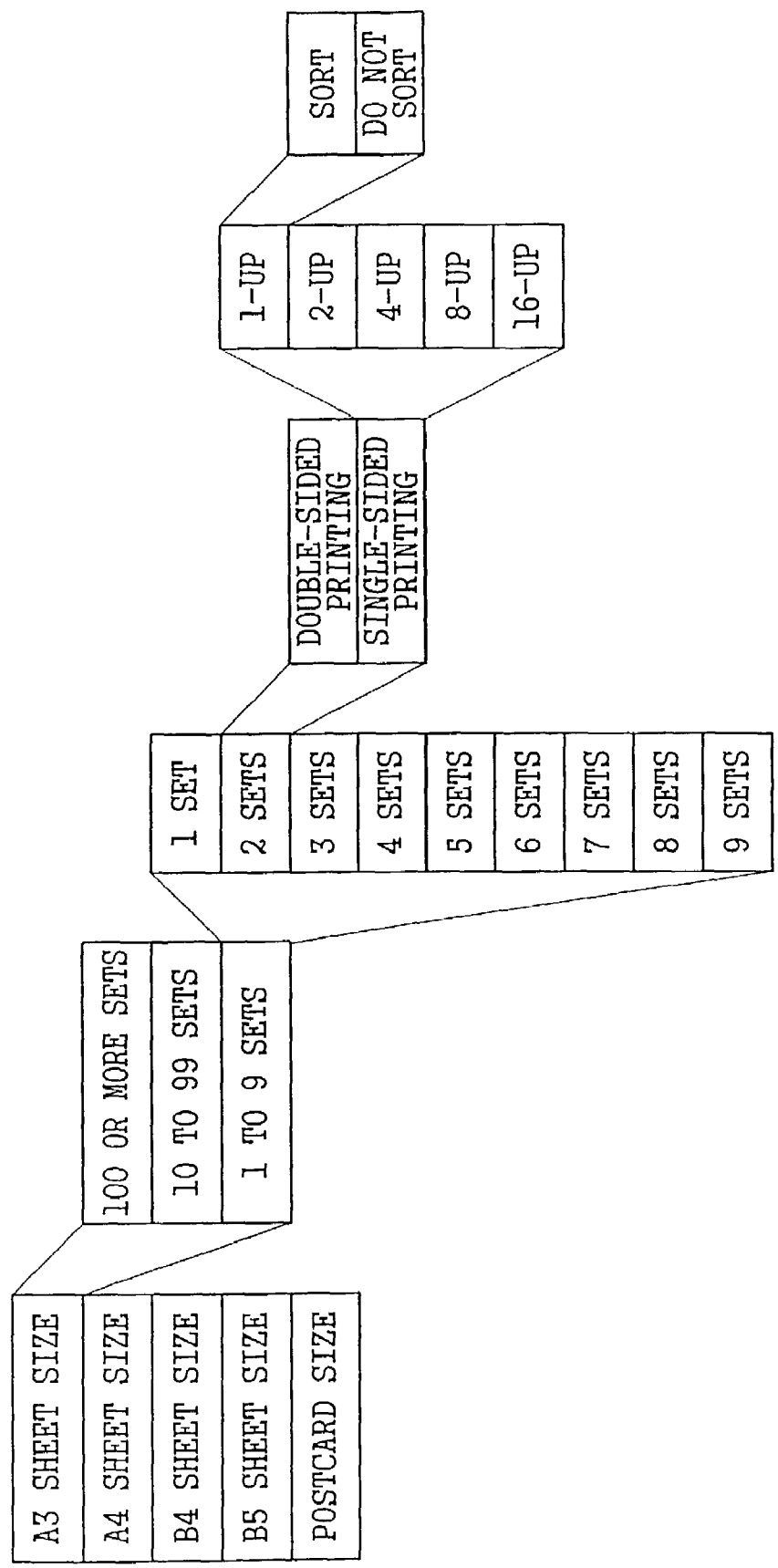
FIG. 3 is a diagram for explaining a first example of hierarchical information in the data storage section.

The hierarchical structure shown in FIG. 3 can be used as the folder structure in the data storing section 14.

In this hierarchical structure, first, regions corresponding to a plurality of printing conditions relating to sheet size are provided. Each region is defined as a folder. Here, regions corresponding to plural printing conditions relating to the number of sets are provided as the next lowest hierarchy. In FIG. 3, regions corresponding to printing conditions relating to the number of sets are provided at the hierarchy beneath the region corresponding to the sheet size of A3. For example, when the printing device 10 can print up to 999 sets, 999 regions from 1 set to 999 sets can be provided as the regions relating to the number of sets. However, in the present embodiment, first, 1 to 9 sets is selected from among regions which are 1 to 9 sets, 10 to 99 sets, and 100 or more sets. Then, the region of 2 sets is selected. Printing conditions relating to double-sided/single-sided printing are provided at the hierarchy below the number of sets. Printing conditions relating to N-UP printing are provided at the hierarchy below the double-sided/single-sided printing. Regions relating to sorting are provided at the hierarchy below that. In this way, as regions (second regions) below regions (first regions) corresponding to a given printing condition, regions of printing conditions relating to items other than the item of the given printing condition are provided. Further, the contents of these printing condition are set as the folder names of the regions defined as folders. In FIG. 3, only the hierarchies below A3 sheet size are shown. However, lower hierarchies relating to the number of sets are similarly provided for A4 sheet size, B4 sheet size, B5 sheet size, and postcard size as well. All of the regions of the other printing conditions, which are the number of sets, double-sided/single-sided printing, N-UP, and sorting, respectively have lower hierarchies. When print data is stored in any of the regions of the data storing section 14 of the printing device 10 structured in this way, the PDL processing section 22 or the parser section 24 of the printing device 10 interprets the print data on the basis of the printing conditions corresponding to the region in which the print data is stored. The print data, which is expanded into image data at the rendering processing section 18, is printed at the printing mechanism 20 by the control of the printing control section 16. In this case, when print data is stored in a region of the lowest hierarchy (i.e., in correspondence with each of the storage regions 1 through n in FIG. 2), printing is carried out in accordance with all of the printing conditions corresponding to the hierarchies thereabove. Namely, in the case of FIG. 3, when, for example, print data is stored in the region corresponding to "sort", printing is carried out under the printing conditions of "A3 sheet size, 2 sets, single-sided printing, 1-UP, sort". If print data is stored in a region other than the lowest hierarchy, printing is carried out in accordance with all of the printing conditions corresponding to the hierarchies above that hierarchy, and by using default values (initial values) determined in advance for printing conditions of hierarchies lower than that hierarchy. Specifically, when print data is stored in the region of single-sided printing in FIG. 3, printing is carried out under the printing conditions of "A3 sheet size, 2 sets, single-sided printing", and for N-UP and sorting, printing is carried out under printing conditions of initial values of, for example, "1-UP, do not sort" which are set in advance as initial values.

Figure 4:
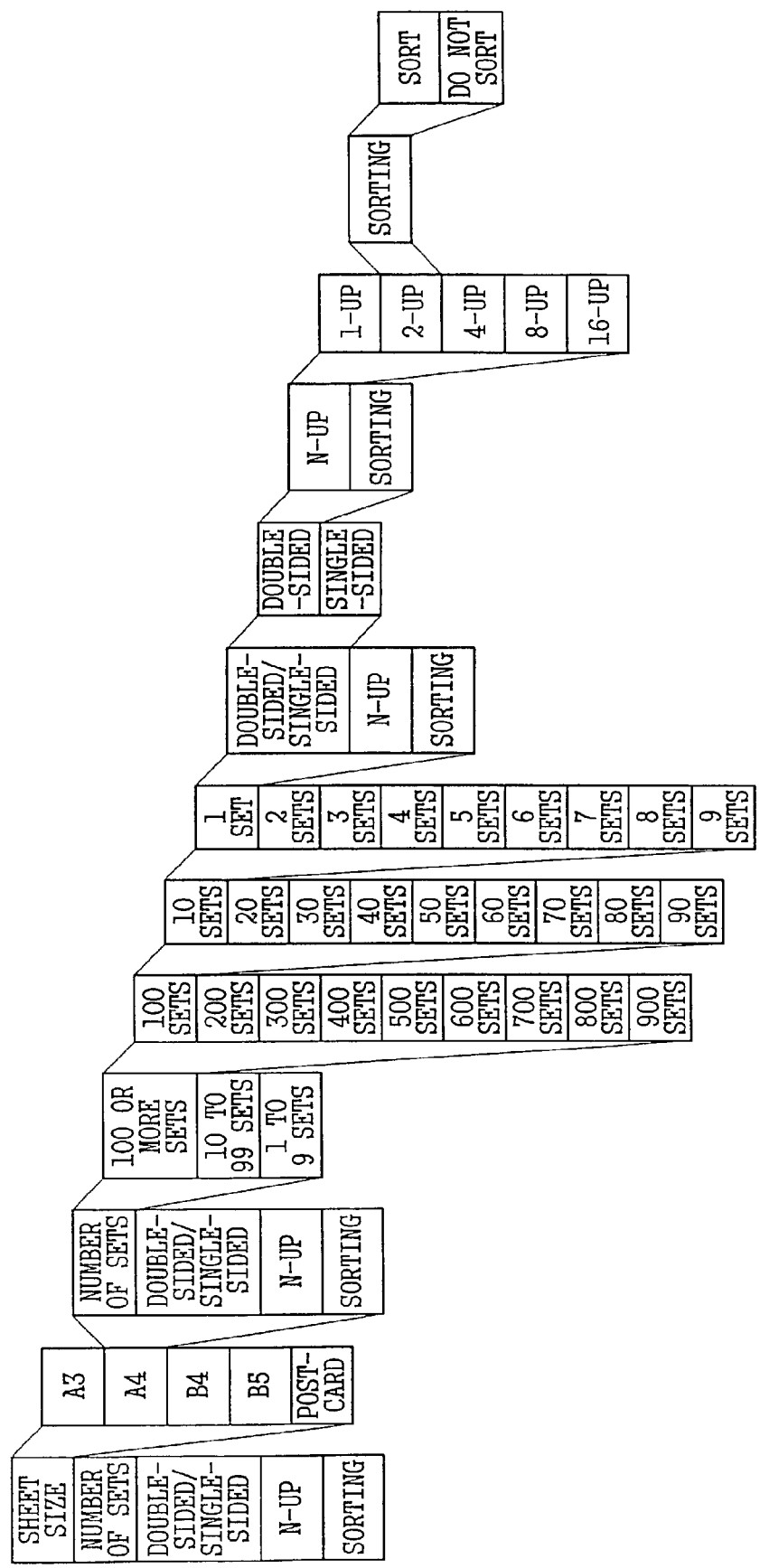
FIG. 4 is a diagram for explaining a second example of hierarchical information in the data storage section.

Further, the hierarchical structure shown in FIG. 4 can be used as the folder structure in the data storing section 14.

In FIG. 4, the regions of the items of the printing conditions of sheet size, number of sets, double-sided/single-sided printing, N-UP, and sorting are provided. Regions relating to set values of sheet sizes of "A3, A4, B4, B5, postcard" are provided as the hierarchy beneath of the sheet size. Further, regions for items other than the sheet size, which has already been selected at the higher hierarchy, are provided at the lower hierarchies of the region of "A4". In this way, in the example of FIG. 4, first, regions (first regions) relating to items of printing conditions are provided, and, as the hierarchy therebeneath, regions (second regions) of set values for the item selected in the higher hierarchy are provided. Further, at the hierarchy below the regions of the set values, regions (third regions) for items of printing conditions other than the item selected in the higher hierarchy are provided. Here, in the example shown in FIG. 4, hierarchies corresponding to the number of digits of the number of sets are provided at regions relating to the set values of the number of sets. In the case of the example shown in FIG. 4, the regions corresponding to "111 sets" are designated. In the printing device 10 structured in this way, when print data is stored in a region of a set value of a printing condition of the lowest hierarchy, printing is carried out in accordance with all of the printing conditions corresponding to the hierarchies thereabove. For example, in FIG. 4, when print data is stored in the "do not sort" region, the print data is printed under the printing conditions "A4, 111 sets, double-sided printing, 2-UP, do not sort".

When print data is stored in a region of a set value of a given printing condition, printing is carried out in accordance with all of the printing conditions corresponding to the hierarchies above that hierarchy, and by using default value (initial values) determined in advance for printing conditions of hierarchies lower than that hierarchy. For example, in FIG. 4, when print data is stored in the region "double-sided printing", printing is carried out under the conditions of "A4, 111 sets, double-sided printing", and for N-UP and sorting, printing is carried out at initial values of, for example, 1-UP, do not sort which are set in advance as initial values (initially set values).

In the example of FIG. 4, because there is "111 sets" which are regions of a plural number of sets, the region relating to "sorting" is provided at a lower hierarchy. In regions lower than the region of "1 set", there is no point in designating a printing condition relating to the absence/presence of sorting. Thus, it is possible to not provide a region relating to "sorting". In this way, if there are, at lower hierarchies, items of printing conditions for which setting is pointless, when a given printing condition is set, it is preferable to not provide such regions.

Figure 5:
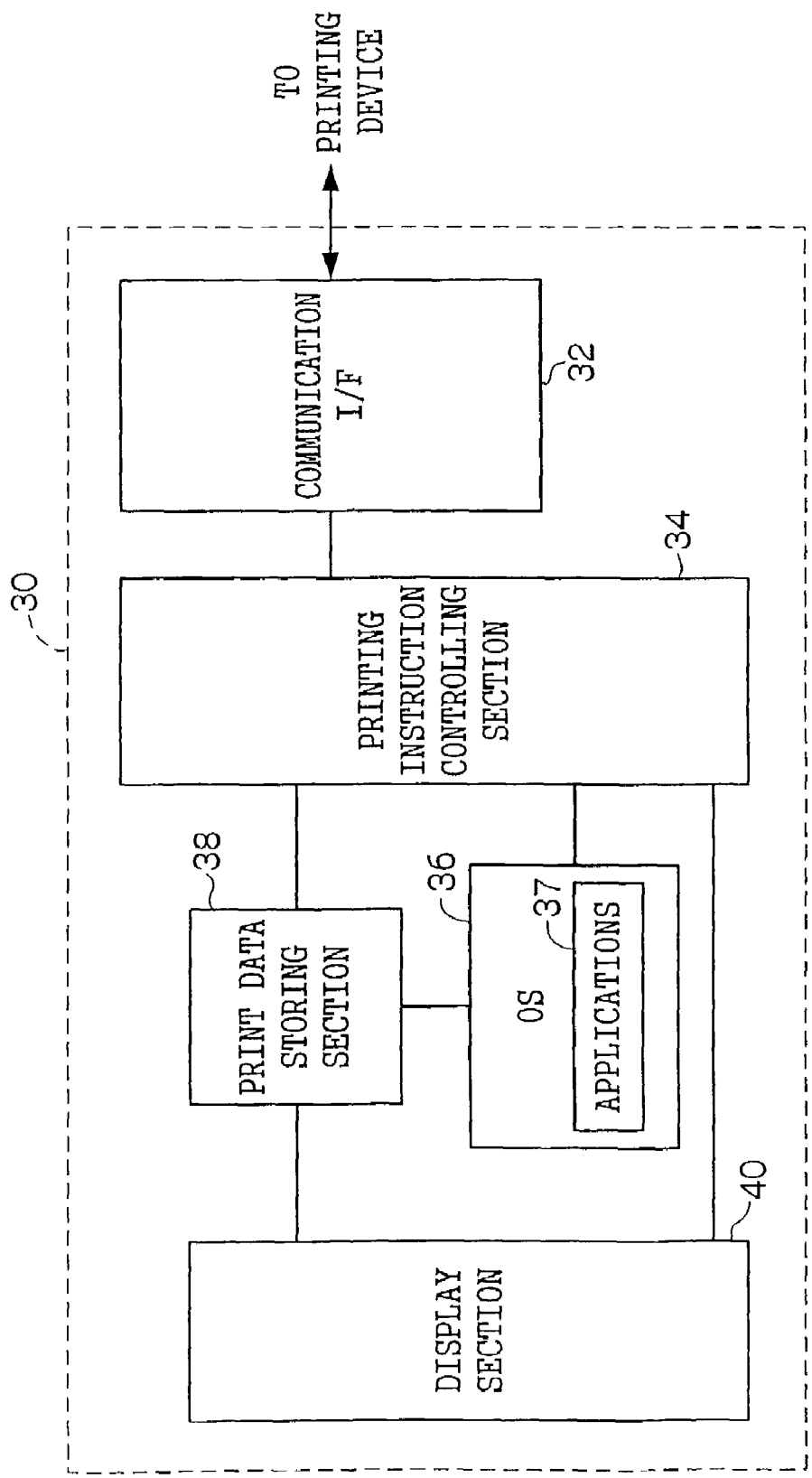
FIG. 5 is a diagram showing the schematic structure of a host device relating to the embodiment of the present invention.

The schematic structure of the host device is shown in FIG. 5.

A host device 30 has an OS 36 which is executed under control of a main control section (not shown); a plurality of application programs 37 which are installed on the OS 36; a display section 40 formed by a display such as a CRT, a liquid crystal display device, or the like; a print data storing section 38; a communication interface (communication I/F) 32 for carrying out communication with the printing device; and a printing instruction controlling section 34 for giving printing instructions.

Files prepared by the application programs 37 or print data prepared in PDL are stored in the print data storing section 38. The files stored in the print data storing section 38 are not limited to files prepared by the application programs 37 of the host device 30, and, for example, may be files transmitted as e-mail attachments from other host devices or may be files downloaded from a file server. The host device 30 transmits a file, which has been designated by a user from among the files stored in the print data storing section 38, to the printing device 10 via the communication I/F 32.

The host device 30 receives, from the printing device 10, information relating to the folder structure of the data storing section 14 of the printing device 10, and displays it on the display section 40. The folder structure of the data storing section 14 of the printing device 10 is displayed by icons. The printing conditions corresponding to the folders are displayed as the names of the folders. In this way, a user can visually recognize and grasp the folder structure relating to the printing conditions of the data storing section 14 of the printing device 10.

Note that, in the present embodiment, the display on the display section 40 is carried out by file manipulating software which is provided in advance at the OS 36 and which manipulates folders and files. However, the present invention is not limited to the same. For example, a web server may be provided at the printing device 10, and information relating to printing conditions which can be set at the printing device 10 can be displayed via the internet as a list at the display section 40 of the host device 30. In this case, at the host device 30, display can be carried out via a browser software for viewing web sites.

In the present embodiment, the host device 30 receives information relating to the folder structure from the printing device 10, and displays the information on the display section 40. However, the information relating to the folder structure of the printing device 10 may be downloaded from a CD-ROM or a floppy disk, or from the home page of the manufacturer of the printing device or the like, and installed in advance into the host device 30.

Next, the operation of the present embodiment will be described.

Figure 6:
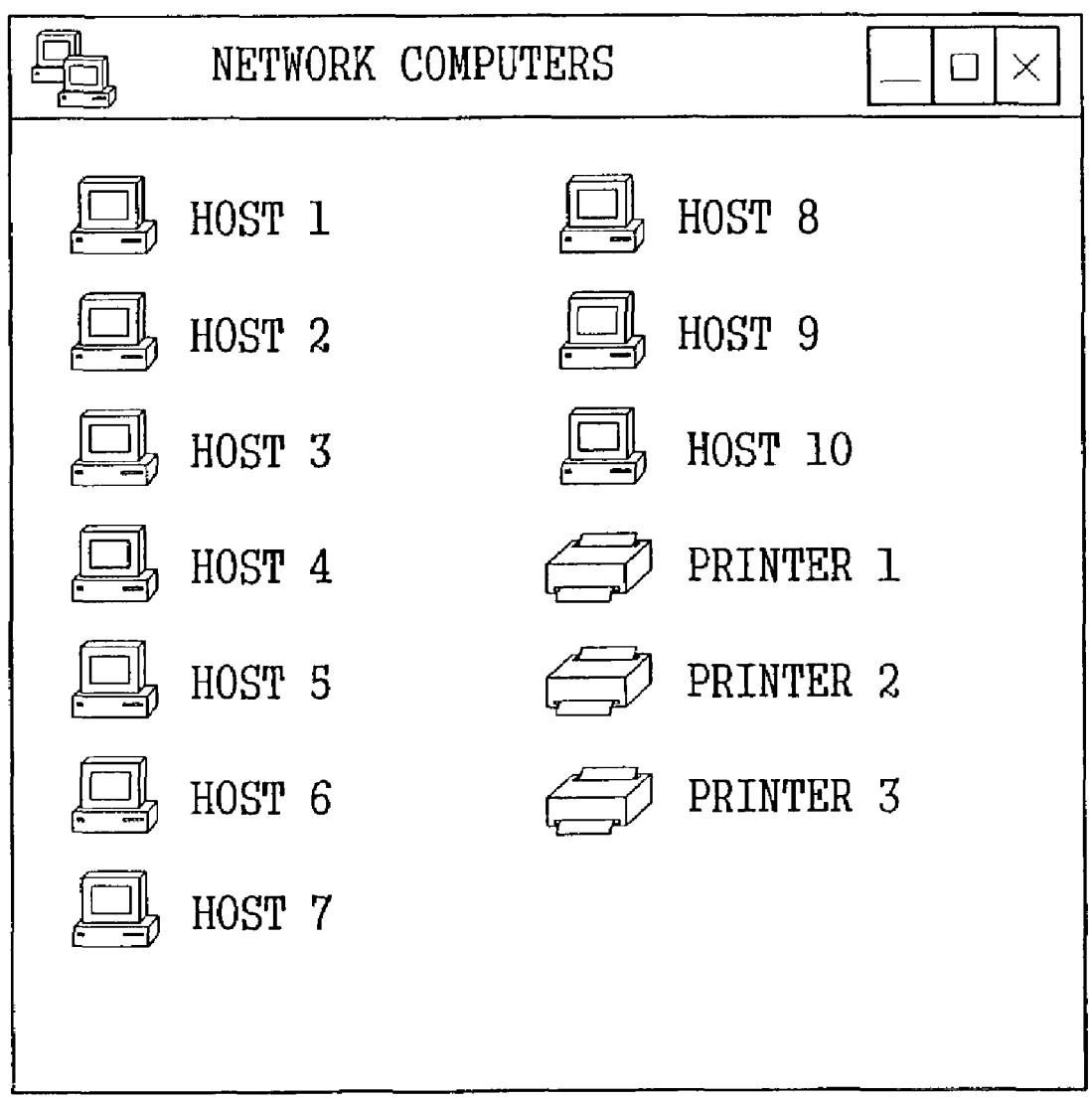
FIG. 6 is a diagram for explaining one example of a display screen showing a folder group corresponding to host devices and the printing devices relating to the embodiment of the present invention.

At the host device 30 to which the printing device 10 relating to the present embodiment is connected, a screen such as that shown in FIG. 6, which lists the respective devices connected on the network to which the host device 30 (corresponding to HOST 1 for example) is connected, is displayed on the display section 40. As shown in FIG. 6, in the present embodiment, the printing device 10 (corresponding to PRINTER 1 for example) is displayed so as to be able to referred to, in the same way as the other host devices and file servers and the like which are the connected devices on the network.

Here, let us assume that the printing device 10 (PRINTER 1) which carries out printing is selected on the display section 40. When, for example, the hierarchical structure shown in FIG. 3 is used, the choices relating to the printing conditions which can be designated at the selected printing device 10 (PRINTER 1) are displayed as the folder structure at the data storing section 14 of the printing device 10, as shown in FIGS. 7A through 7F. The choices are displayed as folders. The flow of switching between the respective display screens (FIG. 7) by the user manipulating the folders is shown in FIG. 8.

Figure 8:
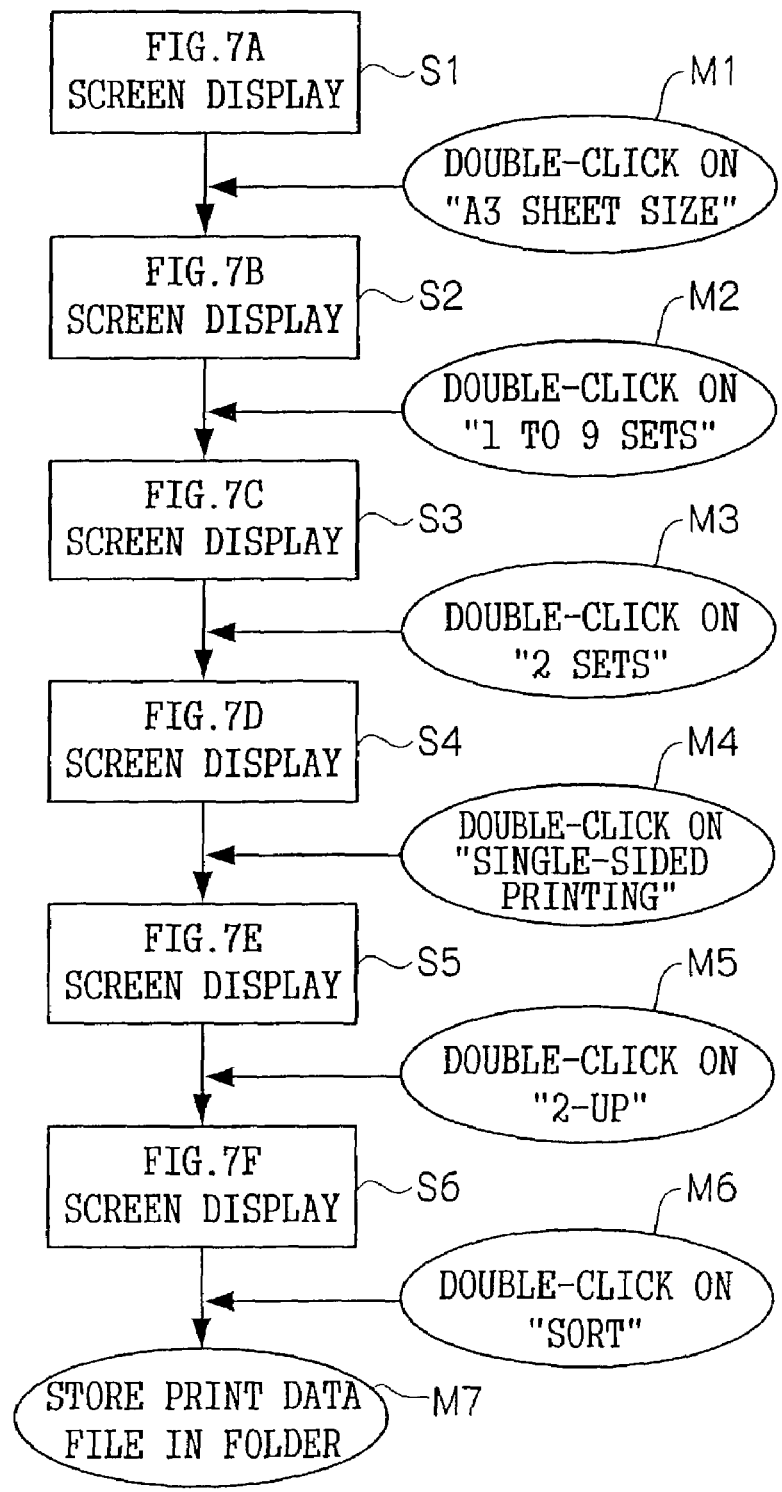
FIG. 8 is a diagram for explaining a flow of switching by folder operations of the respective display screens shown in FIGS. 7A through 7F.

First, when "PRINTER 1" is selected as the printing device 10 at the display screen shown in FIG. 6, as shown in FIG. 7A, a folder group, in which the printing conditions relating to the sheet size are set as the names of the folders, is displayed (state S1 in FIG. 8). Here, when "A3 sheet size" is selected for example (operation M1 in FIG. 8), next, a folder group, in which the printing conditions relating to the number of sets are set as the names of the folders, is displayed as shown in FIG. 7B as the lower folders (state S2 in FIG. 8). Here as well, when the folder "1 to 9 sets" is selected (operation M2 in FIG. 8) in order to designate the desired number of sets which is, for example, 2 sets, in the next hierarchy, display is carried out as per FIG. 7C (state S3 in FIG. 8). Here, printing of the desired 2 sets is selected (operation M3 in FIG. 8). In the next hierarchy, as shown in FIG. 7D, the folder group corresponding to double-sided printing and single-sided printing is displayed (state S4 in FIG. 8). Here, when "single-sided printing" is selected (operation M4 in FIG. 8), in the next hierarchy, the folder group showing the number of pages of data to be printed on a single page in the N-UP printing is displayed as shown in FIG. 7E (state S5 in FIG. 8). Here, for example, "2-UP" is selected (operation M5 in FIG. 8). In the next hierarchy, as shown in FIG. 7F, the folder group relating to the presence/absence of sorting is displayed (state S6 in FIG. 8). Here, "sort" is selected (operation M6 in FIG. 8). In this way, by carrying out selections until the folder relating to sorting which is the lowest hierarchy, manipulation of the file of the print data into this folder is carried out (operation M7 of FIG. 8). In this way, the print data is transmitted to and stored in the corresponding folder designated at the host device 30, which folder is provided in the data storing section 14 within the printing device 10.

The method of file manipulation here may be carried out by dragging and dropping the icon of the print data on the folder by using a mouse. Or, the print data to be transmitted and the folder which is the transmission destination may be designated and the print data transmitted. At this time, the file to be transferred may be in the format of an application file prepared by an application, or may be in PDL format. Further, although FTP and HTTP which are generally used are preferable for file transfer, the file transfer is not limited to these protocols. Moreover, here, print data, for which no file manipulation is carried out, is transferred to the folder at the lowest hierarchy. However, the print data can be transmitted at a stage designated midway through the hierarchies. For example, at the time when designations have been given up to the folder of FIG. 7D designating whether double-sided printing is to be carried out or not, when manipulation of the file of print data to that folder is carried out, the print data is transmitted to the "A3 sheet size" and the "2 sets" which were designated at levels higher than the hierarchies higher than the printing condition relating to double-sided printing, and is transmitted to the folder "single-sided printing" which was designated last. In this case, printing is carried out in accordance with the designations of A3 sheet size, 2 sets, single-sided printing which have been designated at the printing device 10, and for the sorting and N-UP which are designated at the lower hierarchies, printing is carried out on the basis of initial values registered in advance.

Here, we assume that the printing device 10 (PRINTER 1) which carries out printing is selected at the display section 40. When the folder structure at the data storing section 14 of the printing device 10 is, for example, the hierarchical structure shown in FIG. 4, choices relating to the printing conditions which can be designated at the selected printing device 10 (PRINTER 1) are displayed as shown in FIGS. 9 through 13. The choices are displayed as folders. The flow of switching between the respective display screens (FIGS. 9 through 13) by folder manipulation of the user is shown in FIG. 14.

Figure 9A:
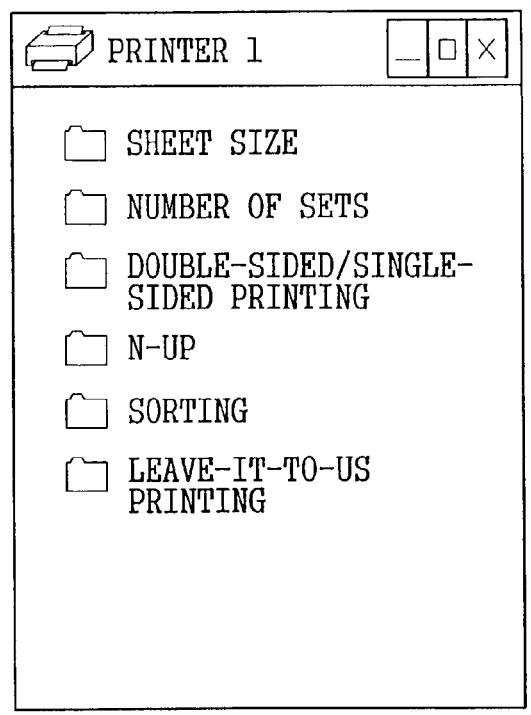
FIGS. 9A and 9B are diagrams for explaining examples of display screens showing folder groups corresponding to the second example of the hierarchical information of FIG. 4.
Figure 14:
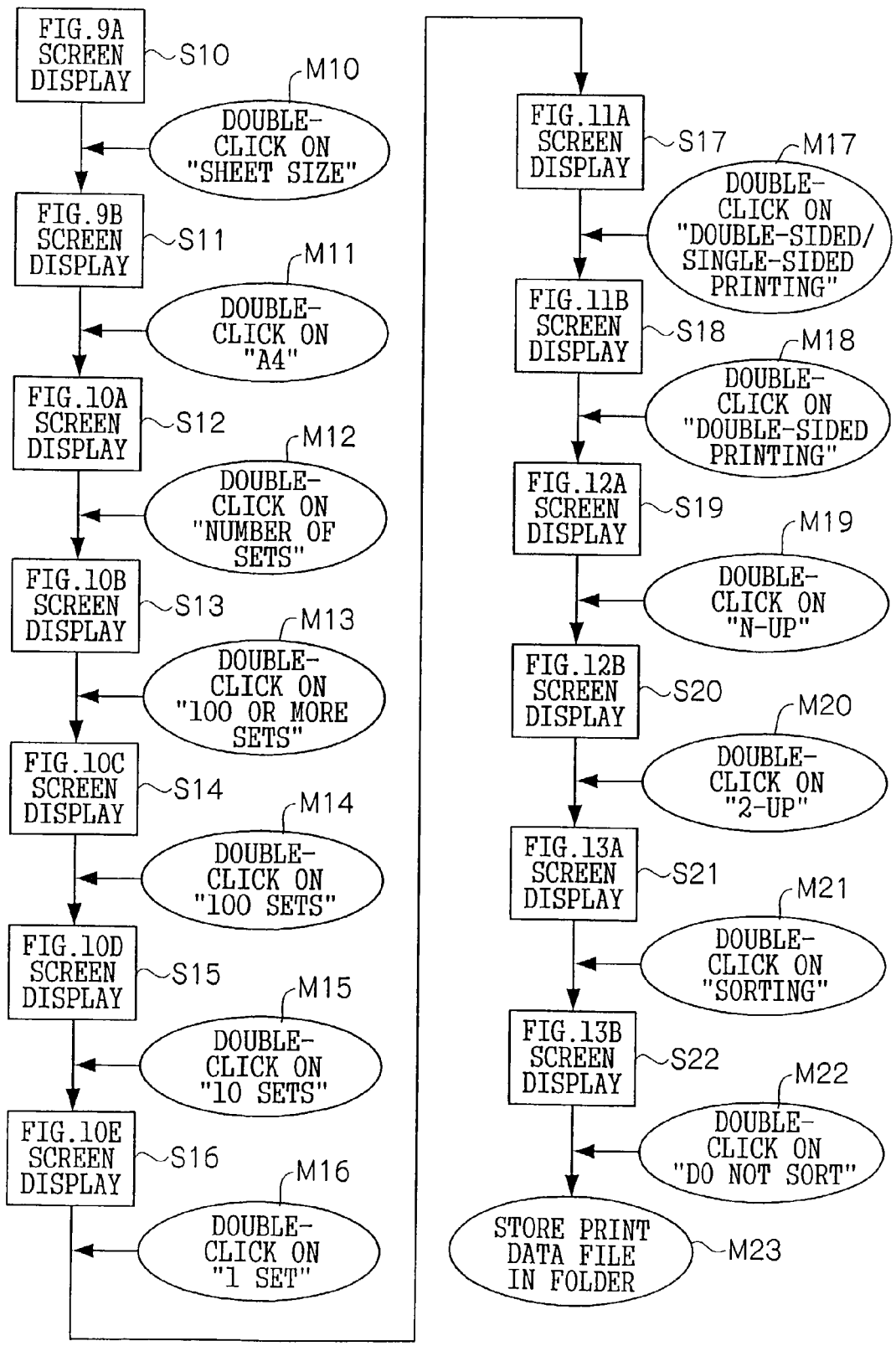
FIG. 14 is a diagram for explaining a flow of switching by folder operations of the respective display screens shown in FIGS. 9 through 13.

First, when "PRINTER 1" is selected as the printing device 10 in the display screen shown in FIG. 6, as shown in FIG. 9A, a folder group, in which the choices for the items of the printing conditions are set as the names of the folders, is displayed (state S10 in FIG. 14). In the case of FIG. 9A, sheet size, number of sets, double-sided/single-sided printing, N-UP, sorting, and leave-it-to-us printing (details of which will be described later) are displayed.

Figure 9B:
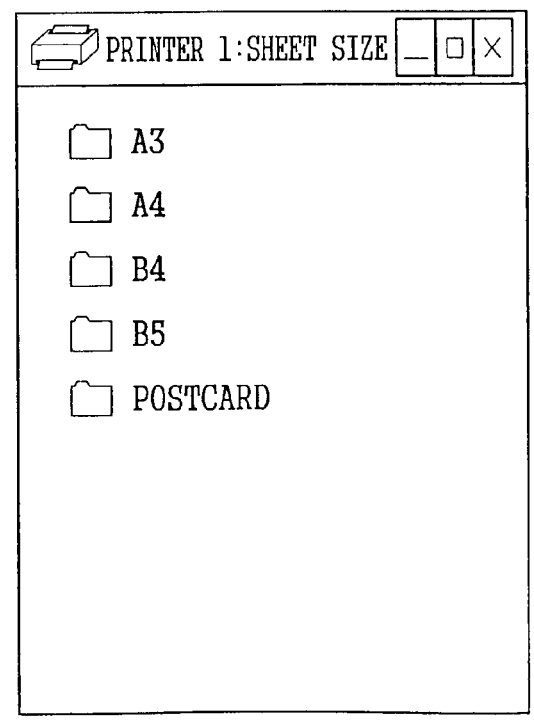
Figure 10A:
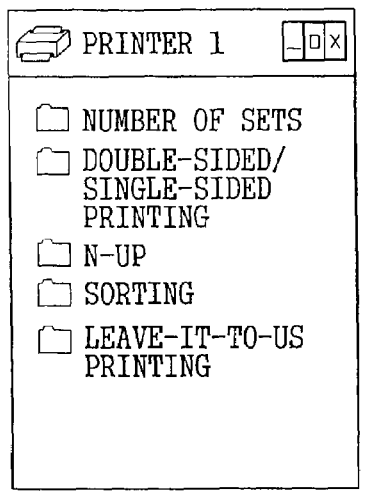
FIGS. 10A through 10E are diagrams for explaining examples of display screens showing folder groups corresponding to the second example of the hierarchical information of FIG. 4.
Figure 10B:
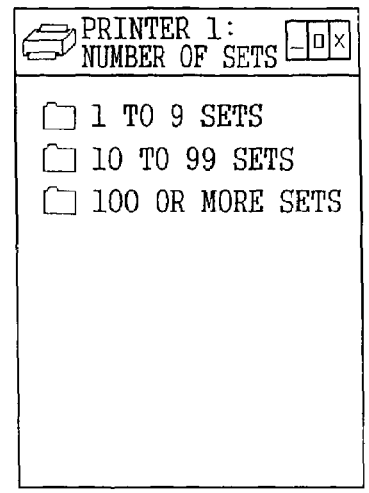
Figure 10C:
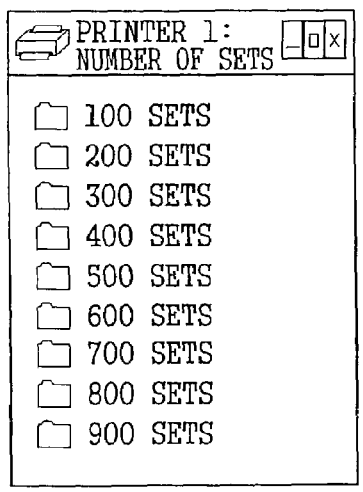
Figure 10D:
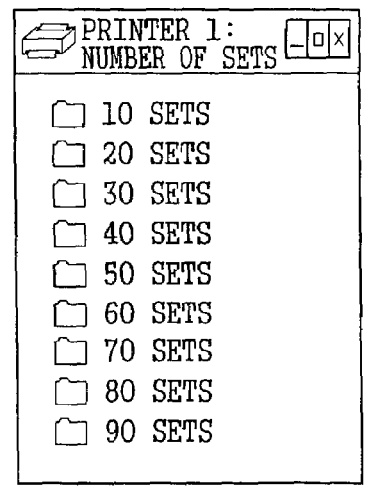
Figure 10E:
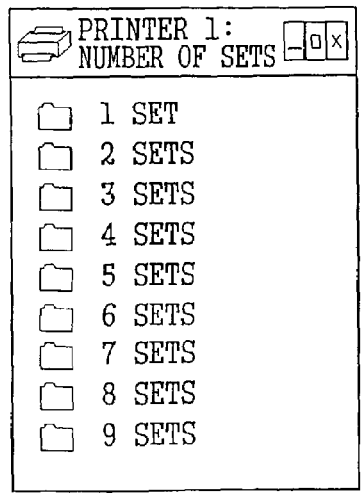
Figure 11A:
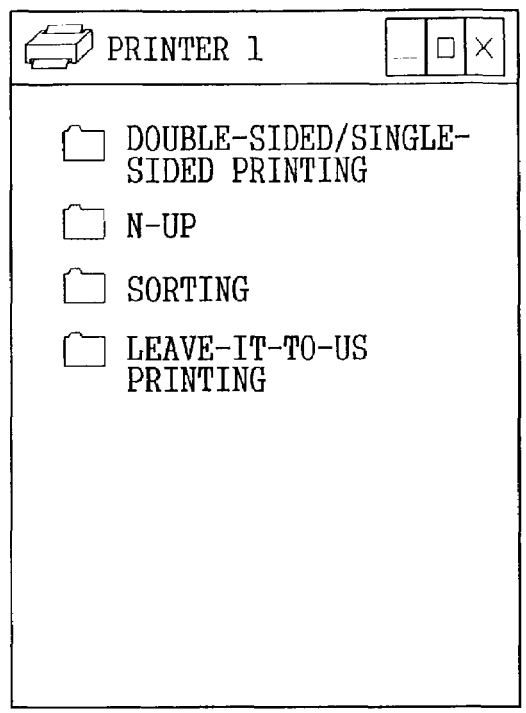
FIGS. 11A and 11B are diagrams for explaining examples of display screens showing folder groups corresponding to the second example of the hierarchical information of FIG. 4.

Here, when, for example, the "sheet size" folder is selected (operation M10 in FIG. 14) in a case in which designations are to be carried out starting from the sheet size, as shown in FIG. 9B, a folder group, in which set values relating to the sheet sizes which can be printed at the printing device 10 are set as the names of the folders, is displayed (state S11 in FIG. 14). Here, when the user selects a folder corresponding to the desired sheet size (e.g., folder "A4") (operation M11 in FIG. 14), as shown in FIG. 10A, a folder group, in which number of sets, double-sided/single-sided printing, N-UP, sorting and leave-it-to-us printing, which are the items of the printing conditions other than the sheet size which has already been selected, are set as the names of the folders, is displayed as the hierarchy therebeneath (state S12 in FIG. 14). Here, for example, in a case in which 111 sets is to be designated as the number of sets, when the "number of sets" folder is selected (operation M12 in FIG. 14), as shown in FIG. 10B, a folder group, in which items in which set values relating to the number of printable sets at the printing device 10 are classified in accordance with the values ("1 to 9 sets", "10 to 99 sets", "100 or more sets") are set as the names of the folders, is displayed as the hierarchy therebeneath (state S13 in FIG. 14). Here, when the "100 or more sets" folder is selected (operation M13 in FIG. 14), as shown in FIG. 10C, a folder group, in which items in which set values relating to the number of sets are classified further in accordance with the values ("100 sets", "200 sets", . . . , "900 sets") are set as the names of the folders, is displayed as the hierarchy therebeneath (state S14 in FIG. 14). Here, when the folder "100 sets" is selected (operation M14 in FIG. 14), as shown in FIG. 10D, a folder group, in which items in which the set values relating to the number of sets are classified further in accordance with the values ("10 sets", "20 sets", . . . , "90 sets") are set as the names of the folders, is displayed as the hierarchy therebeneath (state S15 in FIG. 14). Here, when the "10 sets" folder is selected (operation M15 in FIG. 14), as shown in FIG. 10E, a folder group, in which items in which the set values relating to the number of sets are classified further in accordance with the values ("1 set", "2 sets", . . . , "9 sets") are set as the names of the folders, is displayed as the hierarchy therebeneath (state S16 in FIG. 14). Here, when the folder "1 set" is selected (operation M16 in FIG. 14), as shown in FIG. 11A, a folder group, in which double-sided/single-sided printing, N-UP, sorting, and leave-it-to-us printing, which are items of the printing conditions other than the sheet size and the number of sets which have already been selected, are set as the names of the folders, is displayed as the hierarchy therebeneath (state S17 in FIG. 14).

Figure 11B:
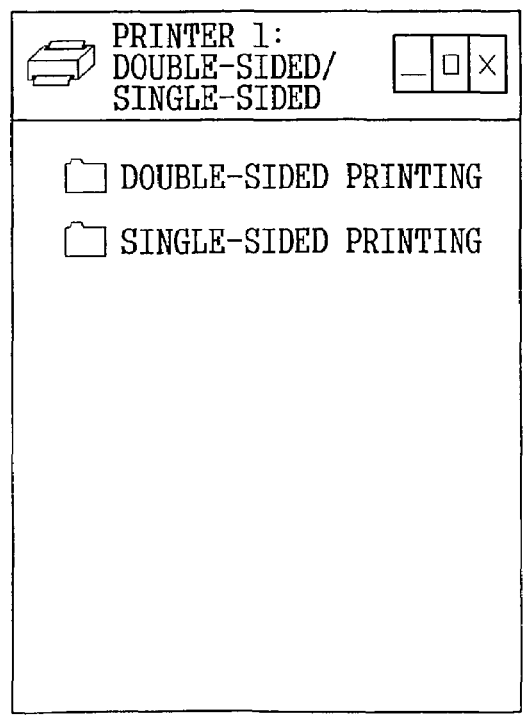
Figure 12A:
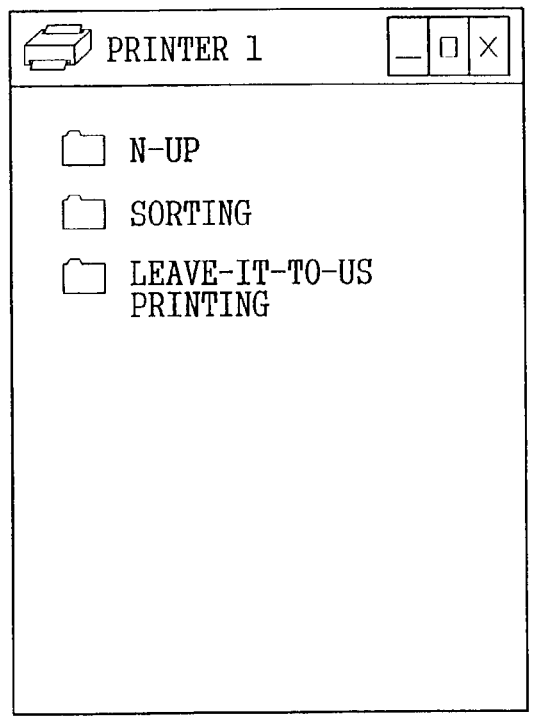
FIGS. 12A and 12B are diagrams for explaining examples of display screens showing folder groups corresponding to the second example of the hierarchical information of FIG. 4.

Next, for example, when the "double-sided/single-sided printing" folder is selected (operation M17 in FIG. 14) in a case in which double-sided printing is to be designated, as shown in FIG. 11B, a folder group, in which set values relating to double-sided/single-sided printing which can be carried out at the printing device 10 are set as the names of the folders, is displayed as the hierarchy therebeneath (state S18 in FIG. 14). Here, when the "double-sided printing" folder is selected (operation M18 in FIG. 14), as shown in FIG. 12A, a folder group, in which N-UP, sorting, and leave-it-to-us printing, which are items of printing conditions other than the sheet size, the number of sets, and double-sided/single-sided printing which have already been selected, are set as the names of the folders, is displayed as the hierarchy therebeneath (state S19 in FIG. 14).

Figure 12B:
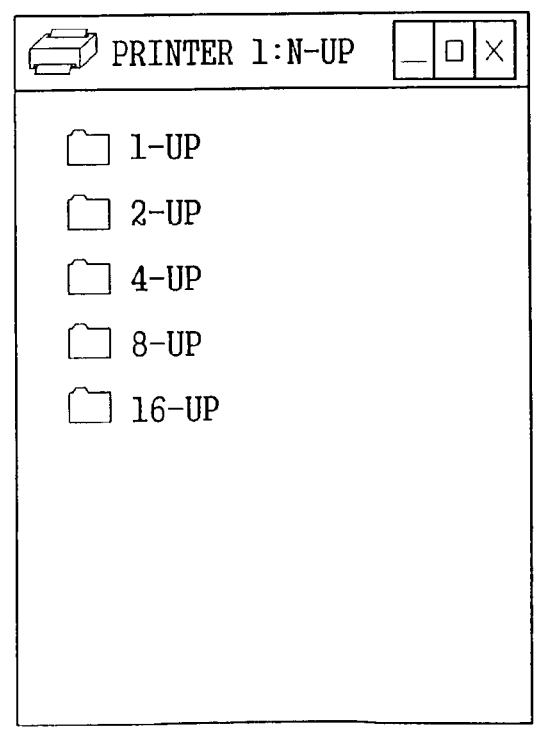
Figure 13A:
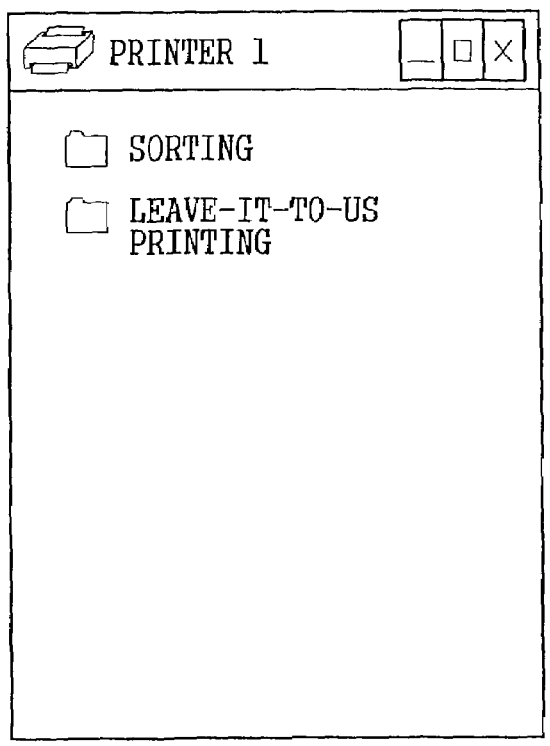
FIGS. 13A and 13B are diagrams for explaining examples of display screens showing folder groups corresponding to the second example of the hierarchical information of FIG. 4.

Next, in a case in which, for example, 2-UP printing is to be designated as the N-UP printing, when the "N-UP" folder is selected (operation M19 in FIG. 14), as shown in FIG. 12B, a folder group, in which set values relating to the N-UP printing which can be carried out at the printing device 10, is displayed as the hierarchy therebeneath (state S20 in FIG. 14). Here, when the "2-UP" folder is selected (operation M20 in FIG. 14), as shown in FIG. 13A, a folder group, in which sorting and leave-it-to-us printing, which are the items of printing conditions other than sheet size, number of sets, double-sided/single-sided printing and N-UP which have already been selected, are set as the names of the folders, is displayed as the hierarchy therebeneath (state S21 in FIG. 14).

Figure 13B:
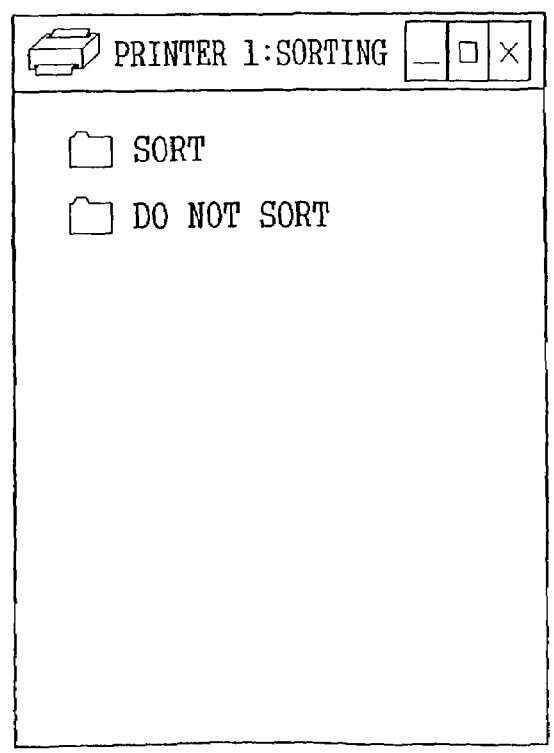

Next, for example, when the "sorting" folder is selected (operation M21 in FIG. 14) in a case in which the presence/absence of sorting is to be designated, as shown in FIG. 13B, a folder group, in which set values relating to sorting which can be set at the printing device 10 are set as the names of the folders, is displayed as the hierarchy therebeneath (state S22 in FIG. 14). Here, for example, the "do not sort" folder is selected (operation M22 in FIG. 14). In this way, at the time when folders have been selected up to the folder relating to sorting which is the lowest hierarchy, manipulation of the file of the print data into that folder is carried out (operation M23 in FIG. 14). In this way, the print data is transmitted to and stored in the corresponding folder designated at the host device 30, which folder is provided at the data storing section 14 within the printing device 10.

In this way, each time an item and a set value of a desired printing condition are selected, items and set values are displayed alternately as the lower hierarchy, and the user can designate the desired printing conditions.

The points relating to the method of file manipulation and the protocol of file transfer and the like, and the point relating to, in a case in which the print data is transmitted to a folder designating a printing condition at a midway hierarchy, pre-registered initial values are used for the printing conditions set at hierarchies therebeneath, are the same as in the above-described example shown in FIG. 8.

Further, in this explanation, the item of sheet size is selected at the display screen shown in FIG. 9A, and then the item of the number of sets is selected at the display screen shown in FIG. 10A as the item of the next printing condition. However, in the present embodiment, the order of selection of the printing items may be any order. For example, setting starting from the item of N-UP printing may be carried out at the display screen shown in FIG. 9A. In this case, the item which is selected next may be any item other than N-UP printing. Namely, if the there are five items which can be set as shown in FIG. 9A (sheet size, number of sets, double-sided/single-sided printing, N-UP printing, sorting), there are 5×4×3×2×1=120 orders for setting all five items.

The leave-it-to-us printing shown in FIGS. 9A, 10A, 11A, 12A, 13A is a folder corresponding to default printing in which, for all of the set items of hierarchies therebeneath, printing is carried out at the initial values. When manipulation of the file of print data to this folder is carried out and the print data is transmitted, default printing can be selected. For example, when the "leave-it-to-us printing" folder of the display screen shown in FIG. 12A is selected, printing is carried out as per the designations for the sheet size, number of sets and double-sided/single-sided printing which have been designated at the higher levels, and the initial values are applied for the other items, i.e., N-UP and sorting.

Figure 15:
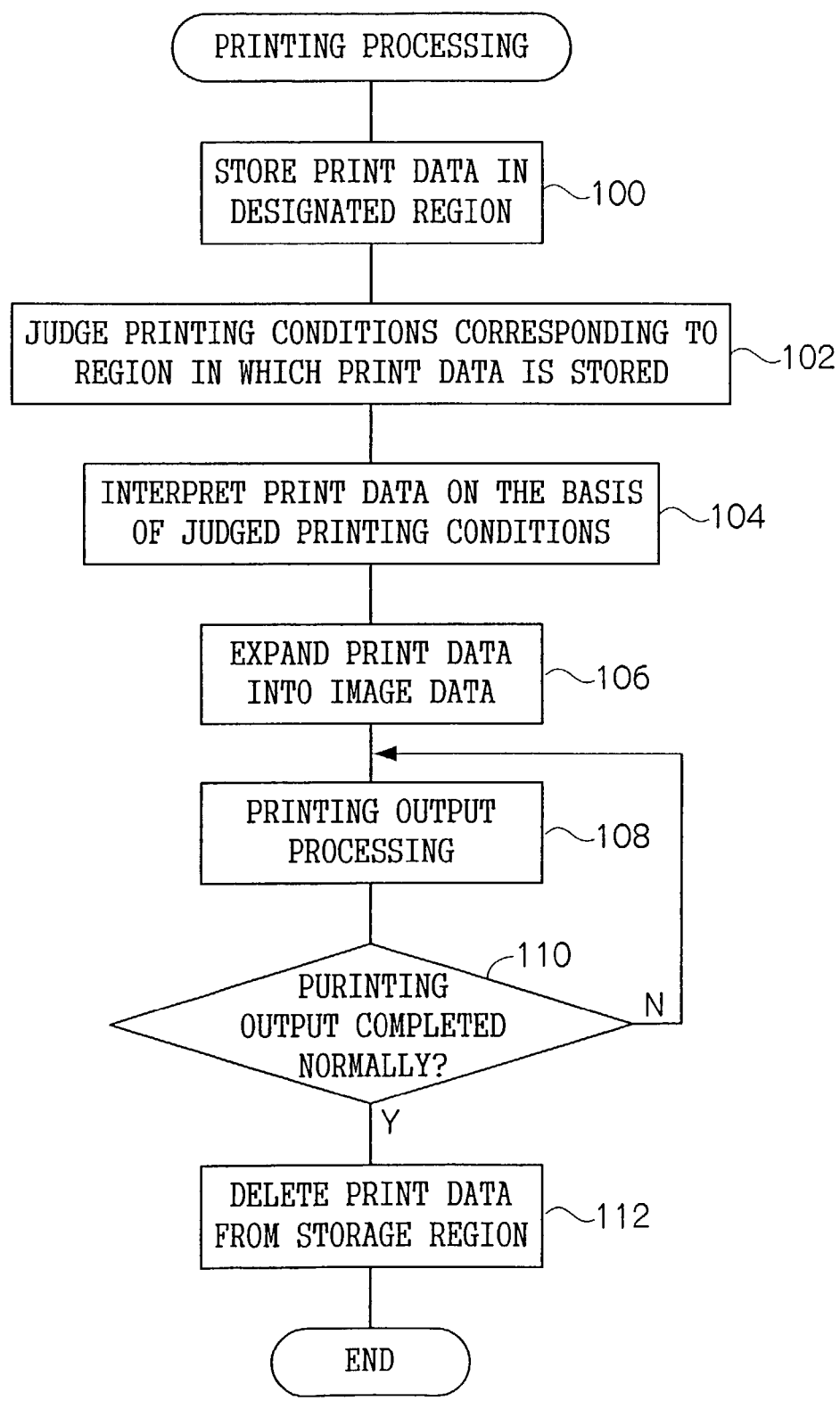
FIG. 15 is a flowchart showing a flow of printing processing relating to the embodiment of the present invention.

In the present embodiment, print data transmission is carried out at the host device 30 as described above, and the processing routine shown in FIG. 15 is executed at the printing device 10.

First, in step 100, the print data from the host device 30 is received at the data receiving section 12. The print data is stored in the region corresponding to the folder the user designated at the host device 30 side, among the regions which correspond to the printing conditions and which are provided at the data storing section 14 of the printing device 10.

Next, when the print data is stored in the region of the data storing section 14, the printing device 10 judges the printing conditions corresponding to the region in which the print data is stored, and at the PDL processing section 22 or the parser section 24, interprets the print data on the basis of the printing conditions corresponding to the region in which the print data is stored (steps 102, 104).

Next, the interpreted print data is expanded into image data at the rendering processing section 18, the printing mechanism 20 is controlled, and printing output is carried out (steps 106, 108). Here, specifically, when the region structure of the data storing section 14 of the printing device 10 is, for example, a structure such as that of FIG. 2, if the print data is stored in storage region 1, printing of the print data is carried out at "A4, 1 set, single-sided printing" which are the printing conditions corresponding to storage region 1. If the print data is stored in storage region 2, printing of the print data is carried out at "A3, 2 sets, double-sided printing, 2-UP".

When it is confirmed that printing has been completed normally, the print data, for which printing output has been completed, is deleted from the region in which it was stored (steps 110, 112). In this way, the data which has been printed does not remain forever within the data storing section 14. The present embodiment is not limited to completely deleting the print data from the data storing section 14, and the data may be overwritten.

Figure 16:
FIG. 16 is a diagram for explaining another example of a display screen for printing condition setting.

In the above-described embodiment, the choices for the printing conditions are displayed as folders and the folder names. However, there is no need to limit the display to folders. For example, as shown in FIG. 16, the choices and radio buttons for selecting any of the choices may be displayed. In this case, as shown in FIG. 16, by pressing "next" button B1 after a desired choice has been selected, the printing condition of the next hierarchy can be selected.

Next, a modified example of the present embodiment will be described.

In the above-described embodiment, when print data is stored in a region provided at the data storing section 14 which has a hierarchical structure relating to the printing conditions, processing of the print data is carried out in accordance with the printing conditions corresponding to that region. The present modified example differs from this in that information, which relates to a folder hierarchical structure corresponding to printing conditions of print data, is received, together with the print data, from the host device 30, and the print data is processed in accordance with this information.

Figure 17:
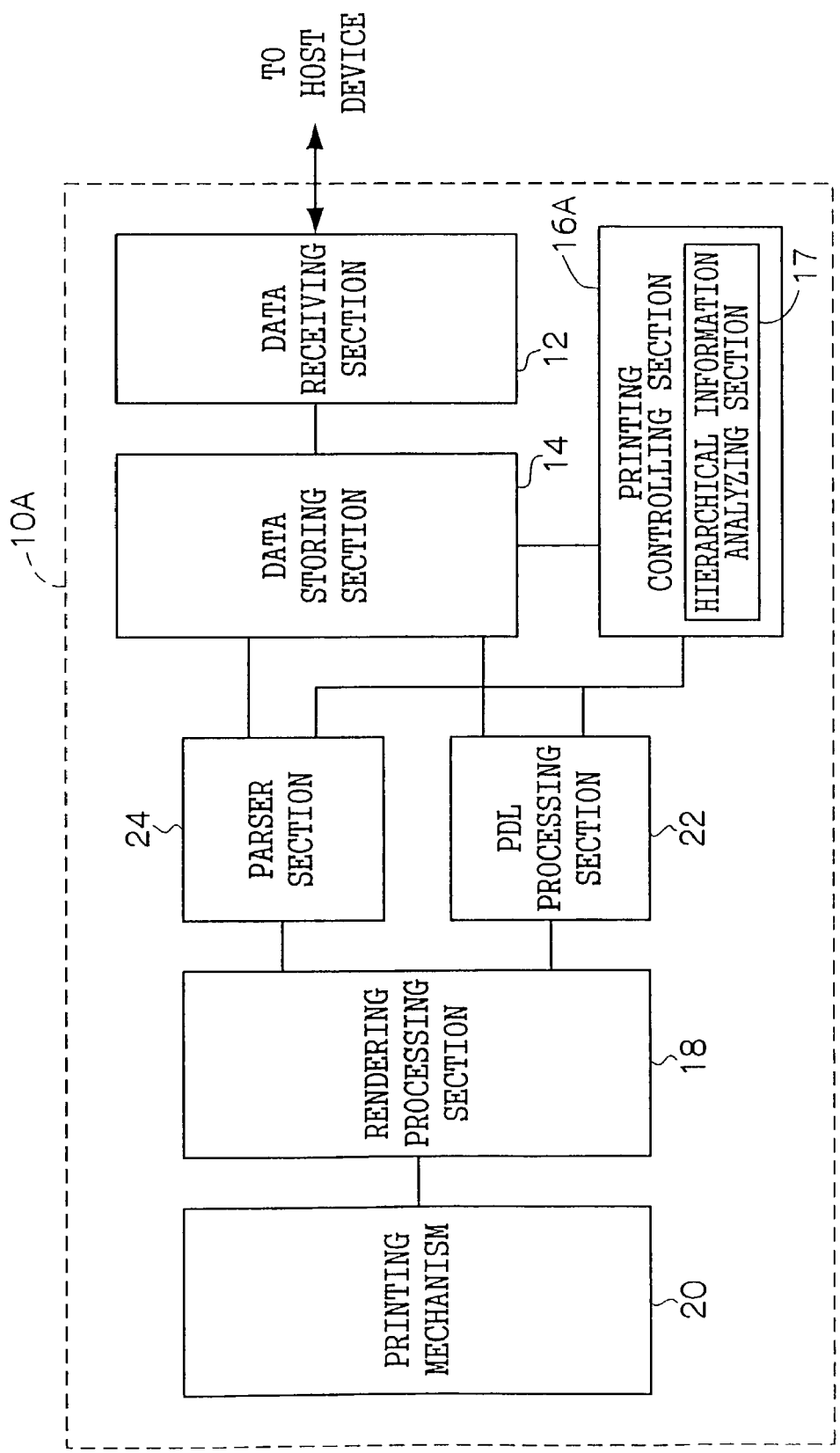
FIG. 17 is a diagram showing the schematic structure of a printing device relating to a modified example of the embodiment of the present invention.

As shown in FIG. 17, a printing device 10A relating to the present modified example is equipped with a printing controlling section 16A, in which the printing controlling section 16 of the printing device 10 of FIG. 1 is further provided with a hierarchical information analyzing section 17.

At the printing device 10A, information relating to the hierarchical structure of the printing conditions, such as the following information for example, is sent together with the print data, from the host device 30.

(1) PRINTER 1: ¥A3SIZE¥2SETS¥DOUBLE-SIDED-PRINTING¥1-UP¥SORT (2) PRINTER 1: ¥SHEETSIZE¥A4¥NUMBEROFSETS¥1SET¥ DOUBLE-SIDED/SINGLE-SIDEDPRINTING¥SINGLE-SIDEDPRINTING¥N-UP¥1-UP¥SORTING¥DONOTSORT

When printing conditions which are designated hierarchically such as above (1) and (2) are received, the hierarchical information analyzing section 17 analyzes the printing conditions from the hierarchical structure of the received information. The printing conditions read here are transmitted to the PDL processing section 22 or the parser section 24 and are interpreted thereat. After interpretation at the PDL processing section 22 or the parser section 24, printing is carried out at the printing mechanism 20 in the same way as in the printing device 10 relating to the above-described embodiment. Here, in (1), the printing conditions are designated hierarchically, and in (2), the items of the printing conditions and the set values are designated hierarchically and alternately. The hierarchical designations of the printing conditions of (1) and (2) use general command functions of the OS 36. Therefore, there is no need to add software exclusively used therefor or the like.

As described above, the object of the present invention can be achieved even when, for printing conditions which the user designates hierarchically, information expressing the hierarchical structure thereof such as above (1) and (2) is transmitted together with the print data.

As described above, the present embodiments provide a printing device, a method of designating printing, and a device for designating printing having the following excellent effects. When printing of print data is instructed, by manipulating the file of the print data, folders, in which plural printing conditions are hierarchically set in advance, are designated hierarchically in a desired combination so as to set the printing conditions of the print data. Thus, there is no need to switch plural tabs and search for the places to set the desired printing conditions, as in a user interface screen in an ordinary printer driver. The instruction of printing having excellent operability for even a first-time user is possible. Further, the present invention is applicable as well to cases in which printing instructions are given not only from a PC, but also from a device having a small display screen. Moreover, operability for the user is excellent.

What is claimed is:

1. A printing device, comprising:
   a storing section that stores information relating to each of a plurality of sets of predetermined printing conditions as one of a plurality of folders, each of the plurality of sets of predetermined printing conditions being set as a name of the respective one of the plurality of folders;
   a receiving section that receives print data and a set of printing conditions from a host device, causing the print data to be stored in the folder named for the set of predetermined printing conditions that matches the received set of printing conditions; and
   a printing controlling section that controls printing of the print data, setting a printing condition of the device in accordance with the predetermined printing conditions of the folder in which the print data stored,
   wherein the plurality of folders has a hierarchical structure.

2. A printing device, comprising:
   a storing section that stores information relating to first regions provided respectively for each of a plurality of sets of predetermined printing conditions, and that stores information relating to second regions provided, as lower hierarchies of the first regions, for predetermined printing conditions relating to items other than a selected item of the predetermined printing conditions set with respect to the first regions;
   a receiving section that receives print data and a set of printing conditions from a host device, causing the print data to be stored in a second region corresponding to the set of predetermined printing conditions that matches the received set of printing conditions; and
   a printing controlling section that controls printing of the print data, setting a printing condition of the device corresponding to the second region which the print data is stored.

3. A printing device, comprising:
   a storing section that stores information relating to a plurality of first regions provided respectively for each of a plurality of items of predetermined printing conditions, and that stores information relating to second regions provided, as lower hierarchies of the first regions, for predetermined set values of the items;

a receiving section that receives print data and a set of printing conditions from a host device, causing the print data to be stored in a second region corresponding to the set of predetermined printing conditions that matches the received set of printing conditions; and a printing controlling section that controls printing of the print data, setting a set value of the device corresponding to the second region in which the print data is stored, wherein the storing section further includes third regions provided for items other than a selected item of the printing conditions set in accordance with the first regions.

4. The printing device of claim 3, wherein items and set values of printing conditions corresponding to the respective regions are set as names of the regions.

5. The printing device of claim 3, wherein when the third regions exist in a case in which a second region is designated such that the print data is stored in the second region, the printing controlling section carries out printing at an initial set value for a set value of a printing condition of a hierarchy lower than the second region.

6. The printing device of claim 4, wherein the regions are folders.

7. A printing device comprising:
a storing section that stores information relating to a each of a plurality of predetermined printing conditions;
a receiving section that receives information relating to a hierarchical structure of printing conditions from a host device;
an analyzing section that analyzes the information relating to the hierarchical structure of the printing conditions; and
a printing controlling section that controls printing of print data, setting printing conditions of the device in accordance with stored predetermined printing conditions that are determined in accordance with the hierarchical structure received at the receiving section and analyzed at the analyzing section.

8. A method of instructing printing, comprising:
storing information relating to a each of a plurality of predetermined printing conditions in a plurality of predetermined files;
displaying a first screen that displays a plurality of first printing conditions;
receiving a selection of one of the first printing conditions displayed on the first screen;
when one of the first printing conditions is selected, displaying a second screen that displays second printing conditions relating to items other than a selected item of the first printing conditions;
receiving a selection of one of the second printing conditions displayed on the second screen;
selecting a predetermined file from the plurality of predetermined files on the basis of the selected first printing condition and the selected second printing condition; and
transferring the predetermined file to a printing device to control printing of print data, setting a print condition of the device in accordance with the predetermined printing conditions stored in the predetermined file.

9. A method of instructing printing, comprising:
storing information relating to set values for each of a plurality of predetermined printing conditions in a plurality of predetermined files;
displaying a first screen that displays an item of a predetermined printing condition;
receiving a selection of an item of a predetermined printing condition displayed on the first screen;
when an item of a predetermined printing condition is selected, displaying a second screen that displays a plurality of set values corresponding to the item;
receiving a selection of at least one of the plurality of set values displayed on the second screen;
when one of the plurality of set values displayed on the second screen is selected, displaying a third screen that displays an item other than a selected item of the printing condition displayed on the first screen;
selecting a predetermined file on the basis of the selected at least one of the plurality of set values; and
transferring the predetermined file to a printing device to control printing of print data,
setting a print condition of the device in accordance with the set values stored in the predetermined file.

10. A method of instructing printing, comprising:
storing information relating to a plurality of predetermined printing conditions in a plurality of predetermined files corresponding to first folders and second folders;
displaying first folders that are provided respectively for plural printing conditions;
receiving a selection of one of the displayed first folders;
when one of the first folders is selected, displaying, as a lower hierarchy, second folders that are provided for printing conditions relating to items other than a selected item of a printing condition set for the first folders;
receiving a selection of one of the displayed second folders; and
transferring the predetermined file that corresponds to the selected second folder to a printing device to control the printing of print data.

11. A method of instructing printing, comprising:
storing information relating to a plurality of predetermined printing conditions in a plurality of predetermined files corresponding to first folders, second folders, and third folders;
displaying a plurality of first folders that are provided respectively for storing plural items of predetermined printing conditions;
receiving a selection of a first folder from among the displayed plurality of first folders;
when the first folder is selected, displaying, as a lower hierarchy, second folders that are provided for storing set values of the item;
receiving a selection of a second folder from among the displayed second folders; and
transferring the predetermined file that corresponds to the selected second folder to a printing device to provide set values to control the printing of print data,
wherein the method of instructing printing further comprises the step of:
when the second folder is selected, displaying, as a lower hierarchy, third folders that are provided for storing items other than a selected item of a printing condition set for the first folder.

12. The method of instructing printing of claim 11, wherein items and set values of printing conditions corresponding to the respective folders are set as names of the folders.

13. A device for instructing printing, comprising:
a storing section that stores information relating to a plurality of predetermined printing conditions in a plurality of predetermined files;
a display section that displays a first screen displaying a plurality of printing conditions, and that, when one of the printing conditions is selected, displays a second screen displaying printing conditions relating to items other than a selected item of the printing conditions displayed on the first screen; and
a transfer section that transfers a predetermined file to a printing device to control printing of print data, setting a printing condition of the device in accordance with the predetermined printing conditions that match the printing condition selected at the first screen and a printing condition selected at the second screen.

14. A device for instructing printing, comprising:
a storing section that stores information relating to a plurality of predetermined printing conditions in a plurality of predetermined files;
a display section that displays, on a first screen, an item of a predetermined printing condition, and that, when an item is selected, displays, on a second screen, a plurality of set values corresponding to the item, and that, when one of the plurality of set values displayed on the second screen is selected, displays, on a third screen, an item other than a selected item of the printing condition displayed on the first screen; and
a transfer section that transfers a predetermined file to a printing device to control printing of print data, setting a printing condition of the device in accordance with the predetermined printing conditions that match the set value selected from among the plurality of set values.

15. A device for instructing printing, comprising:
a storing section that stores information relating to a plurality of predetermined printing conditions in a plurality of predetermined files;
a display section that displays first folders that are provided respectively for storing plural printing conditions, and that, when one of the first folders is selected, displays, as a lower hierarchy, second folders that are provided for storing printing conditions relating to items other than a selected item of a printing condition set for the first folders; and
a transfer section that transfers a predetermined file to a printing device to control printing of print data, setting a printing condition of the device in accordance with the predetermined printing conditions stored the selected first folder and a selected second folder.

16. A device for instructing printing, comprising:
a storing section that stores information relating to a plurality of predetermined printing conditions in a plurality of predetermined files;
a display section that displays a plurality of first folders that are provided respectively for storing plural items of predetermined printing conditions, and that, when a first folder is selected, displays, as a lower hierarchy, second folders that are provided for storing set values of the item; and
a transfer section that transfers a predetermined file to a printing device to control printing of print data, setting a printing condition of the device in accordance with the predetermined printing conditions that match the set values of a selected second folder,
wherein when the second folder is selected, the display section displays, as a lower hierarchy, third folders that are provided for string items other than a selected item of a printing condition set for the first folder.

17. The device for instructing printing of claim 16, wherein items and set values of printing conditions corresponding to the respective folders are set as names of the folders.

18. A printing device, comprising:
a storing section that stores information relating to a plurality of predetermined printing conditions in a plurality of predetermined files;
a first screen information outputting section that outputs information for displaying a first screen that displays a plurality of printing conditions;
a second screen information outputting section that, when one of the printing conditions displayed on the first screen is selected, outputs information for displaying a second screen that displays printing conditions relating to items other than a selected item of the printing conditions displayed on the first screen; and
a printing controlling section that controls printing of print data, setting a printing condition of the device in accordance with the predetermined printing condition that corresponds the printing condition selected at the first screen and a printing condition selected at the second screen.

19. A printing device, comprising:
a storing section that stores information relating to a plurality of predetermined printing conditions in a plurality of predetermined files;
a first screen information outputting section that outputs information for displaying a first screen that displays an item of a predetermined printing condition;
a second screen information outputting that when an item displayed on the first screen is selected, outputs information for displaying a second screen that displays a plurality of set values corresponding to the item;
a third screen information outputting section that when one of the plurality of set values displayed on the second screen is selected, outputs information for displaying a third screen that displays an item other than a selected item of the printing condition displayed on the first screen; and
a printing controlling section that controls printing of print data, setting a printing condition of the device in accordance with the predetermined printing condition that corresponds to a set value selected from among the plurality of set values.

20. The printing device of claim 1, wherein different printing conditions are respectively set in any two folders among the plurality of folders, the two folders being in a high and low hierarchical relation.

21. The printing device of claim 20, wherein the printing conditions of one folder lower in hierarchy of the any two folders inherit a part of the printing conditions which are set in the other folder higher in hierarchy.

22. The printing device of claim 20, wherein one folder higher in hierarchy of the any two folders has an initial set value with respect to a set value of a printing condition which is set in the folder lower in hierarchy.

* * * * *